US011409911B2

(12) United States Patent
Yevgeniya et al.

(10) Patent No.: US 11,409,911 B2
(45) Date of Patent: Aug. 9, 2022

(54) METHODS AND SYSTEMS FOR OBFUSCATING SENSITIVE INFORMATION IN COMPUTER SYSTEMS

(71) Applicants: Mushkatblat Virginia Yevgeniya, Studio City, CA (US); Yuriy Lobzakov, Las Vegas, NV (US)

(72) Inventors: Mushkatblat Virginia Yevgeniya, Studio City, CA (US); Yuriy Lobzakov, Las Vegas, NV (US)

( * ) Notice: Subject to any disclaimer, the term of this patent is extended or adjusted under 35 U.S.C. 154(b) by 0 days.

(21) Appl. No.: 16/433,845

(22) Filed: Jun. 6, 2019

(65) Prior Publication Data
US 2019/0332806 A1 Oct. 31, 2019

Related U.S. Application Data

(62) Division of application No. 14/706,956, filed on May 7, 2015, now Pat. No. 10,339,341.

(60) Provisional application No. 61/990,028, filed on May 7, 2014.

(51) Int. Cl.
*G06F 21/62* (2013.01)

(52) U.S. Cl.
CPC ...... *G06F 21/6254* (2013.01); *G06F 21/6245* (2013.01)

(58) Field of Classification Search
CPC ............. G06F 21/6254; G06F 21/6245; G06F 21/6227
USPC ........................................................ 726/26
See application file for complete search history.

(56) References Cited

U.S. PATENT DOCUMENTS

| 4,642,793 | A | * | 2/1987 | Meaden | G06F 16/9014 711/216 |
| 5,963,646 | A | * | 10/1999 | Fielder | H04L 9/0869 380/259 |
| 6,049,612 | A | * | 4/2000 | Fielder | H04L 9/0869 380/44 |
| 6,105,133 | A | * | 8/2000 | Fielder | H04L 9/0891 380/283 |
| 2006/0050335 | A1 | * | 3/2006 | Dorrell | H04N 1/6086 358/516 |
| 2009/0254572 | A1 | * | 10/2009 | Redlich | G06Q 10/107 |
| 2010/0027784 | A1 | * | 2/2010 | Tuyls | H04L 63/061 380/44 |
| 2011/0093719 | A1 | * | 4/2011 | Duhaime | G06Q 20/383 713/182 |
| 2011/0096942 | A1 | * | 4/2011 | Thyssen | G10L 21/0208 381/94.1 |
| 2011/0307440 | A1 | * | 12/2011 | Panchenko | G06F 16/27 707/600 |
| 2012/0004849 | A1 | * | 1/2012 | Aarre | G01V 1/28 702/14 |

(Continued)

OTHER PUBLICATIONS

NPL Search Results (Year: 2020).*

(Continued)

*Primary Examiner* — Syed A Zaidi
(74) *Attorney, Agent, or Firm* — Mahesh Law Group PC; Kumar Maheshwari (57) ABSTRACT

A data-masking tool encoded on one or more computing readable storage media that includes a code that uses a combination of fields that uniquely identifies data in a record and utilizing it as a reference to mask original data with substitute values, by either aggregating several into one, mapping one-to-one or expanding one into a set.

19 Claims, 11 Drawing Sheets

(56) References Cited

U.S. PATENT DOCUMENTS

2013/0182002 A1* 7/2013 Macciola ............... G06V 10/25
345/589
2015/0128285 A1 5/2015 LaFever

OTHER PUBLICATIONS

NPL Search Results (Year: 2021).*
Jim Burridge, "Information Preserving Statistical Obfuscation," Statistics and Computing 13.4, 2003, pp. 321-327.
Ardagna et al., "Location Privacy Protection Through Obfuscation-Based Techniques," IFIP Annual Conference on Data and Applications Security and Privacy. Springer Berlin Heidelberg, 2007, pp. 47-60.
Domingo-Ferrer et al., "On the Security of Noise Addition for Privacy in Statistical Databases," International Workshop on Privacy in Statistical Databases, Springer Berlin Heidelberg, 2004, pp. 149-161.
Aggarwal et al., "A General Survey of Privacy-Preserving Data Mining Models and Algorithms," Privacy Preserving Data Mining, Springer US, 2008 pp. 11-52.

* cited by examiner

| MARY | 2.629 | EVA | 2.629 |
|---|---|---|---|
| PATRICIA, LINDA | 1.073+1.035 | KAREN | 2.108 |
| BARBARA, ELIZABETH, NORMA | 0.98+0.937 | LUCIA | 1.917 |
| ETC. | | | |

Fig. 11

METHODS AND SYSTEMS FOR OBFUSCATING SENSITIVE INFORMATION IN COMPUTER SYSTEMS

CROSS REFERENCE AND PRIORITY CLAIMS

This application is a divisional application of U.S. Utility application Ser. No. 14/706,956, filed on May 7, 2015, which claims the benefit of U.S. Provisional Application No. 61/990,028, filed May 7, 2014, which is incorporated herein by reference in its entirety.

BACKGROUND

It is common in financial, health care and similar organizations to display customer-related information to an authorized agent for the purpose of processing and modifying the information. However, customer-related information (personally identifiable information (PII)) has to be protected during the development and testing process of such systems or applications, so unauthorized personnel would not be able to access sensitive information. Sensitive elements are often shown in a production environment. Sometimes reporting data is displayed in the production environment for external and public purposes. Even when sensitive information is covered, it is covered in such a way that a malicious outsider may able to re-identify the original entity (person or organization) sensitive attributes by using publicly available sources of information such as birth and death records, assessor's office records on housing, etc.

SUMMARY

Embodiments provide a method and system of masking an original data by replacing it with a similar fictional data of the same type and format. This system or method is applied when a request for data is received from an unauthorized person for development, analysis, demo or other purposes. For example, a company's Quality Assurance engineer may be testing a look and feel of the GUI application for loan processing. Replacing of an actual sensitive data with fictional data will not affect the behavior of the GUI application, whilst protect a customer's personal and private information. The methods and systems also provide means to protect sensitive information that can be re-identified with the use of public or "big data" available for common use. Data, that is not sensitive, could still be used, as is, for reporting and audit purposes.

A computer-implemented method for masking information, comprising executing on a processor the steps of receiving, from an unmasked data storage media, a first data set that is characterized as having a statistical distribution and the first data set further comprising identifying information. The method includes determining a discrete transform to be performed on the data to remove the statistical distribution relative the identifying information and generating a third data set by replacing portions of the first data set with a second data set, received from public storage media, such that the statistical distribution for the identifying information of the third data different than the statistical distributed that characterized the first data set.

DETAILED DESCRIPTION

Figure 1:
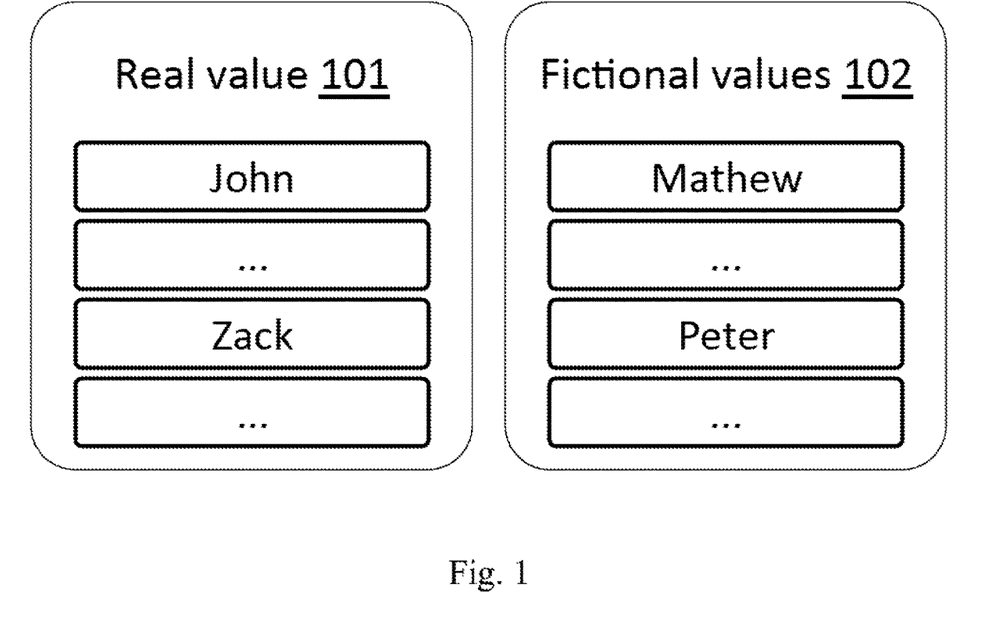
FIG. 1 is a diagram of the one-to-one value mapping masking method example that is reversible and maps values.

Referring generally to the figures, various embodiments describe methods of obfuscating sensitive data. FIG. 1 illustrates one to one value mapping. In FIG. 1, a unique real value is masked by a unique fictional value. For example, the real value 101 may be replaced with fictional value 102 as shown in FIG. 1. In some embodiments, the fictional value is unrelated to the real value so that it is more challenging for an individual to determine the real value based on the fictional value. In some embodiments a fictional value has one corresponding real value. In other embodiments, a fictional value may have more than one corresponding real value determined based on various other data elements. In some embodiments the masking may be reversible. In this embodiment, the sensitive data statistics are preserved or maintain, thus statistics based on the sensitive data may be calculated. Generally available or known sensitive data statistics could be used to reverse engineer a mapping to some limited extent. For example, if the most popular last name Smith mapped to the last name Peterson, it would be easy to guess by simply counting the most common name in the data set, which is Peterson in this case.

Figure 2:
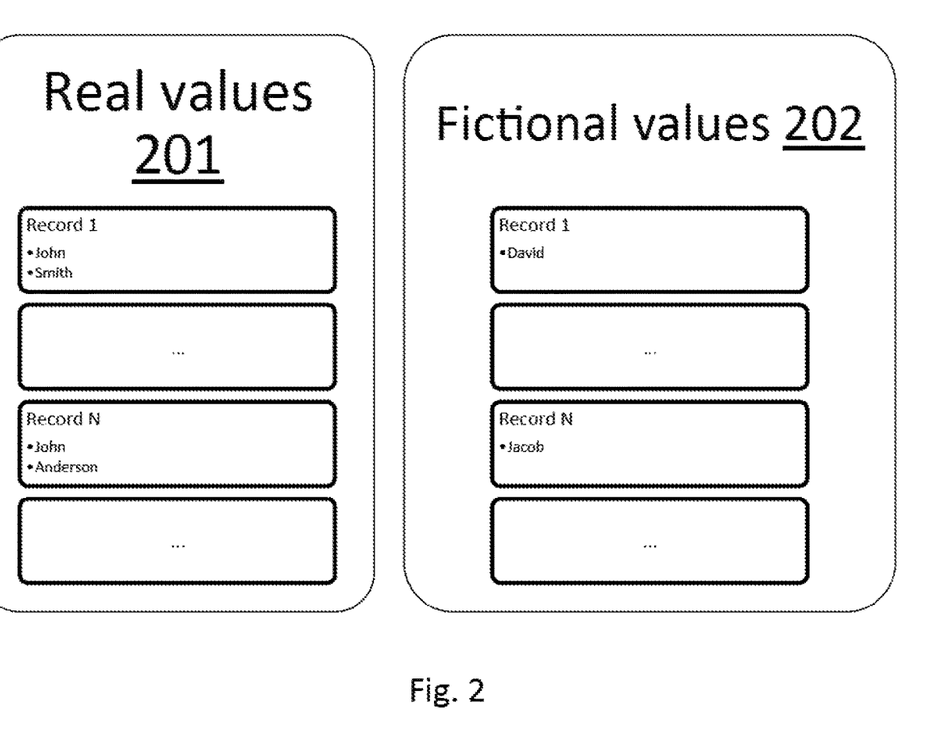
FIG. 2 is a diagram of a set of values to one value mapping masking method example that maybe reversible and provides better statistical distortion to the resulting set so that re-identification is harder to implement.

FIG. 2 illustrates a set of values to a single value mapping scheme. The embodiment illustrated in FIG. 2 may be implemented as unique set of real values 201 to a unique fictional value 202. For example, "John"+"Smith" may always be masked as "David", while "John"+"Anderson" is always masked as "Jacob". In some embodiments, non-changeable auxiliary data related to the same record is used to identify a masking. Statistical distortion in fictional values has better metrics and makes it harder to guess a real value. Various methods may be used to create statistical distortions, such as, using the metadata of the related to the real values may be used to generate the fictional value.

Figure 3:
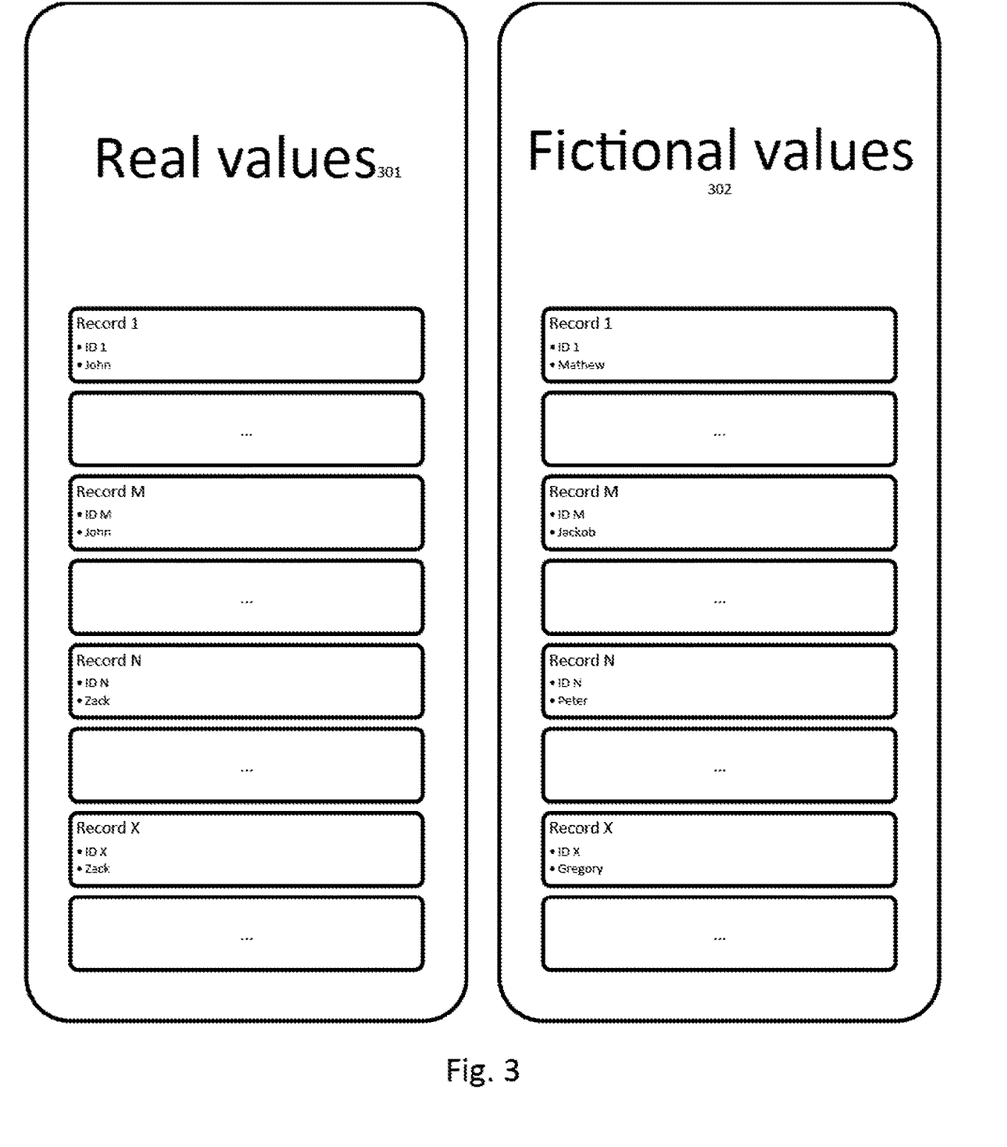
FIG. 3 is a diagram of a one value to multiple values mapping masking method example that allowed for controlled statistical distortion that uses optional unique identifier.

FIG. 3 illustrates one-to-many mapping using mandatory unique record identifier, in either artificially created form or as set of elements uniquely identifying the record, for maintaining referential integrity across systems. In this embodiment, same values are masked by several different values. Fictional statistical data distribution could be controlled. As a result, masking would be impossible to guess by using a statistical data distribution. In various embodiments, the masking could be made reversible. In other embodiments, the masking could be made un-reversible by using additional data elements.

Figure 4:
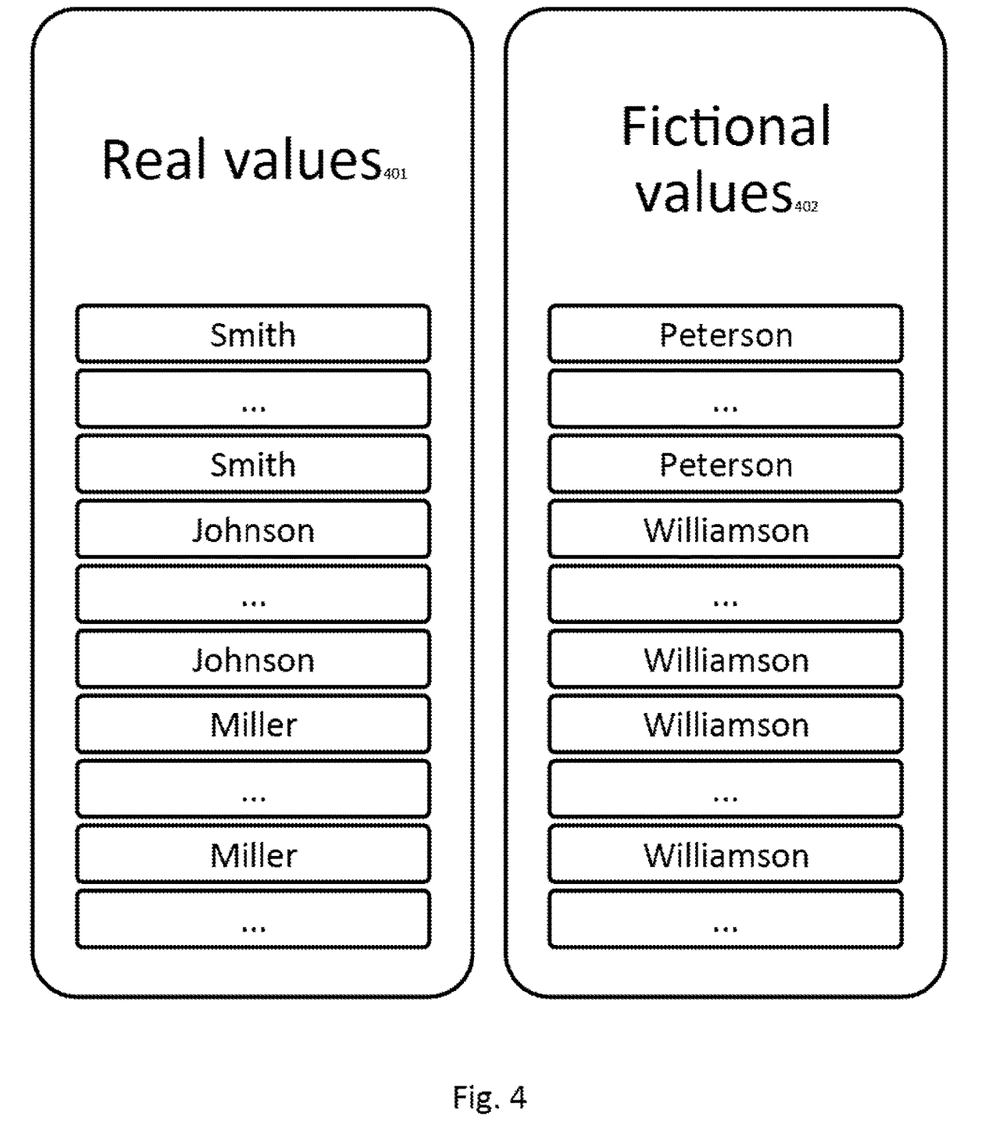
FIG. 4 is a diagram of a one value to multiple values mapping masking method example that depicts aggregated mapping used to hide public data statistics.

FIG. 4 illustrates many-to-one aggregated mapping. In the case when either set of values or record id mapping method is not feasible, a statistical distortion might be performed by aggregating less statistically significant values together to make a combined count of values close to the most statistically significant value in the overall set. E.g. there are 10000 real Smiths (a biggest number of last names), 5000 real Johnsons and 5000 real Millers, Smith would be masked by Peterson, and both Johnson and Miller would be masked by Williamson. Now it is impossible to guess Smiths because the number of Petersons and Williamsons is about the same –10000. Values may be indexed and integer indexes might be used in the mapping procedures instead of actual values.

The unmasked data values may be distributed in a statistical distribution curve. The most common distribution is normal distribution. However, in some embodiments there might be different types of statically distribution patters depending on the set of PII values. Other possible distributions might include Cauchy distribution, Hypergeometric distribution, Poisson distribution, etc. The method pre-defines different distribution of quantities of unique values in the mapped set and allows to map original set to the mapped set with the mapping transform that changes one distribution of quantities of unique values in the set to the other. In the example discussed here, the normal distribution is mapped to the discrete uniform distribution. Changing the statistical distribution can be extended to any type of data transformation. The discrete uniform distribution provides the best protection against a data breach; however, in some cases it is important to maintain the kind of distribution in the mapped set as Normal, but with the different set of quantities or with other changed parameters, as it allows to test ROIs in reports.

The implementation mechanism involves accessing statistics of the source, uploading statistics of the mapping set from specified source—or counting the values as a result of the command or software option. After the source set of values is uploaded together with the mapping set, the program analyses the quantities and sums different permutations of these quantities to allowing to choose the values that will map according to the given statistical distribution transform.

The program assesses the best permutations of quantitative sums fitting statistical transform criteria and creates different mapping of values in accordance with the transform criteria. The example is giving a sample of such assessment. The program can supplement the original set with extra values if such option is allowed and opted into, creating in this particular case the expanded set of values. Values of the mapped set could include any kind of publicly available data, or statistics of the privately available sets, or even the original set as a destination set. The mechanism of the load might include currently known mechanisms via drivers, from files, and via in-memory upload such as via services, or any other similar load mechanisms. The mapped set(s) might also be provided as a default option with the program and might not need to be loaded.

Figure 5:
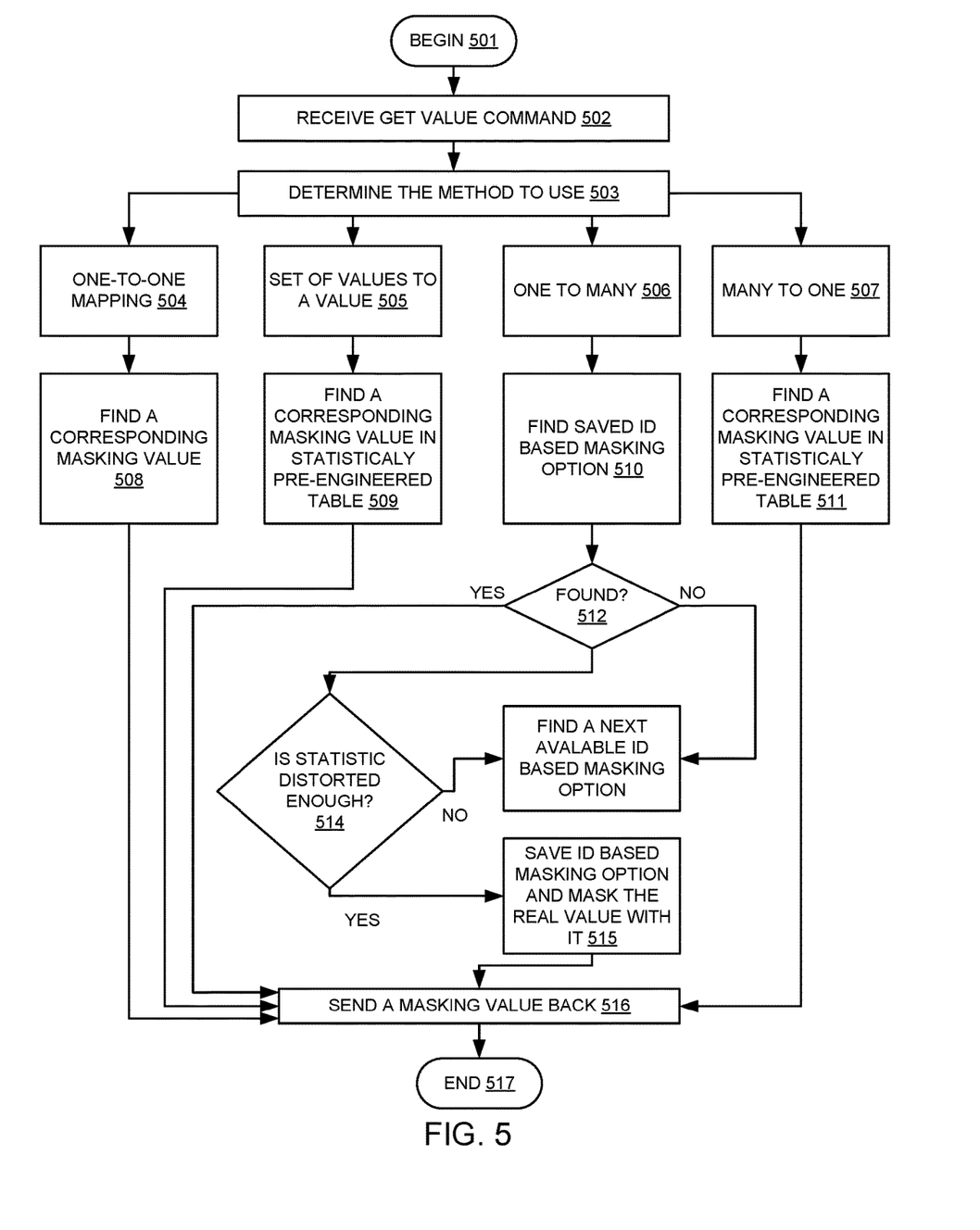
FIG. 5 is a block diagram that depicts a program flow that makes a decision which masking method to use and then proceeds with appropriate algorithm.

Example illustrates a one-to-one value mapping masking method example that is reversible and maps values uniquely. After the system receives the "GET VALUE COMMAND" 502 it defines whether to use the one-on-one masking method 504. As an example, when the values are represented by one value uniquely, such as the case with social security numbers, the system determines that this method is an appropriate method and using one-on-one mapping algorithms and the system finds the corresponding value in the mapping table. It supplies this value on exit 504. For example, 123-45-6789 maps always uniquely to 987-65-4321. As such, this mapping is always unique and can be reversible. These mappings can't be re-identified by applying public data on statistical distribution of the values as they are statistically evenly distributed with the value of distribution equal one value exactly.

Examples illustrating one-to-one value mapping masking method example that may be reversible and uniquely maps non-unique values is discussed in greater detail below. In the case of the non-unique nonetheless single independent values, such as names, if the mapped data set has the same cardinality, and the statistical distributions are known, the mapping can be reversible, and the values can be re-identified with a certainty to which the statistics is non-ambiguous, by applying known statistical distribution of values to mapped values of the same cardinality. For example, if the most popular last name Smith from the received values is mapped to the last name Peterson in the mapped data set, one could re-identify the value of Smith by simply counting the most common name in the data set, which is Peterson in this case. If less popular name Davidson has the same statistical distribution as for example the name Freedman in our statistical data sample, than re-identification takes a form of trying first to re-identify the mapped value as first Davidson then Freedman, and takes two attempts in such situation. Thus, the choice of the data cardinality and corresponding security value of mapping is at the discretion of the practitioner.

Examples illustrating a set of values with optional auxiliary related value to one value mapping masking method example that allows for controlled statistical distortion. If the program or a programmer chooses to use many values to one value mapping 502, 503 the program identifies the set of values to be masked and optionally related auxiliary value(s). The related auxiliary value is often a record identifier upon which the one-to-one relationship among the other values in the set being masked is held. Then based upon either the entire set or this auxiliary value(s) the program finds a corresponding masking value in statistically pre-engineered table with distorted statistics, and creates a mapping with the replacement masking singular value 509. An example of such process is masking a full name that consists of more than one value, such as "John"+"Smith" 201 always with a value "David" 202, while masking "John"+"Anderson" 201 always as "Jacob" 202. Statistical distortion in fictional values has better metrics and makes it harder to re-identify a real value.

Examples discussing one-to-many mapping using mandatory unique record identifier, in either artificially created form or as a set of elements uniquely identifying the record, for maintaining referential integrity across systems is discussed in greater detail. Upon choosing the method by a program 502, 503 if it is determined that there exists an unique identifier or a set of fields that uniquely identify the record, and that there exist more values in the set of masked values than in the original one, the program determines a degree to which the statistics should be distorted. The masking process may be identifying a first id-based masking option 510, 512 and then checking if the degree of distortion is satisfied 514. If not, then in recursive manner the program proceeds to find the next available defined by a pre-specified algorithm id 513 to which map the given id value. If the condition is met, save the id and then mask the related sensitive values with the found ones in the given set of masking values 515, while continually checking the degree of distortion with each cycle. As a result, the same values are masked by several different values from a fictional set which statistical data distribution is controlled. Masking would be impossible to guess by using a statistical data distribution. Such masking could be made reversible depending on the algorithm. As an example, real values of a records 1 through M with corresponding ids and Value="John" 301 will be masked based on the records with same ids but with values of predefined range, for example, Mathew, Jackob, etc. 302

Examples discussing many-to-one aggregated mapping are discussed in greater detail below. If either set of values or record id mapping method is not feasible as determined by program or programmer, 502,503, a statistical distortion might be done by aggregating less statistically significant values together to make a combined count of values close to the most statistically significant value in the overall set. The program would mask a value by finding a masking value 511 in such an aggregate table. E.g. there are 10000 real Smiths (a biggest number of last names in public record set) 401, 5000 real Johnsons and 5000 real Millers, Smith would be masked by Peterson 402 that holds the highest-ranking value of 10000 in the aggregate table, per pre-defined algorithm determining the statistical rank of that particular last name, Smith, in a given set. Both Johnson 401 at the rank of 5000 and Miller 401 at the rank of 5000 would be masked by Williamson 402 that holds the same aggregate mapping value of 10000 for two such names. It may not be possible to guess Smiths because the number of Petersons and Williamsons is about the same −10000.

In the various embodiments discussed herein, the mapping of values in all of the above cases can be done either direct (value to value) or indirect based on mapping to specific data structures and substitute indexes so that mapping can be changed per the request of the user.

Figure 6:
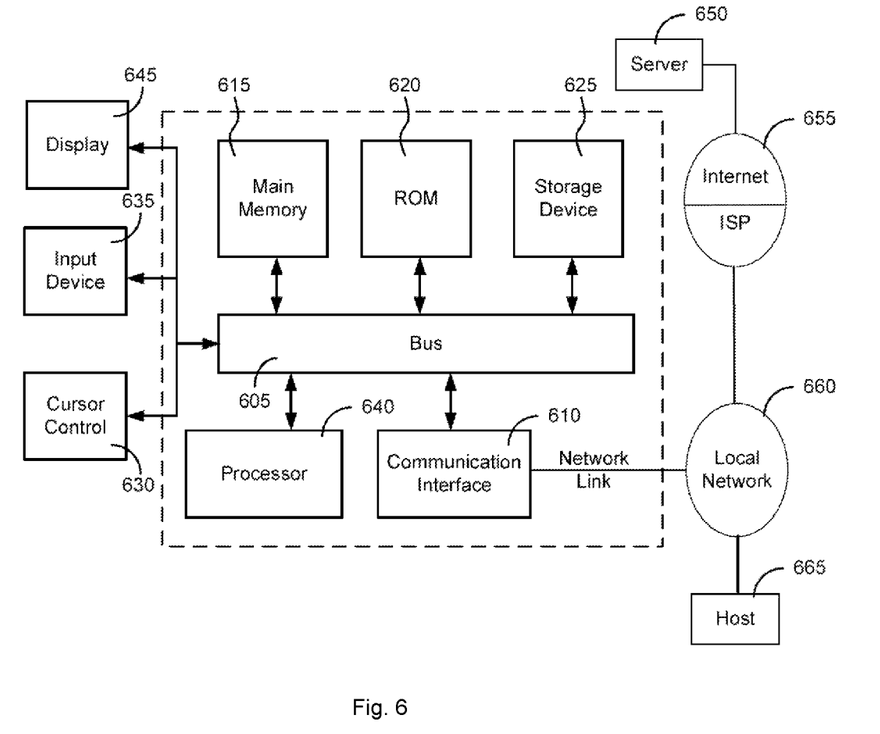
FIG. 6 is a diagram illustrating an example computer system upon which the processes described herein may be implemented.

For example, FIG. 6 is a block diagram that illustrates a computer system 600 upon which various embodiments described herein may be implemented. Computer system 600 includes a bus 602 or other communication mechanism for communicating information, and a hardware processor 604 coupled with bus 602 for processing information. Hardware processor 604 may be, for example, a general-purpose microprocessor or one that is specifically programmed to perform the function described in this disclosure.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile or non-transitory media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over, wireless network, a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated service digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Figure 7:
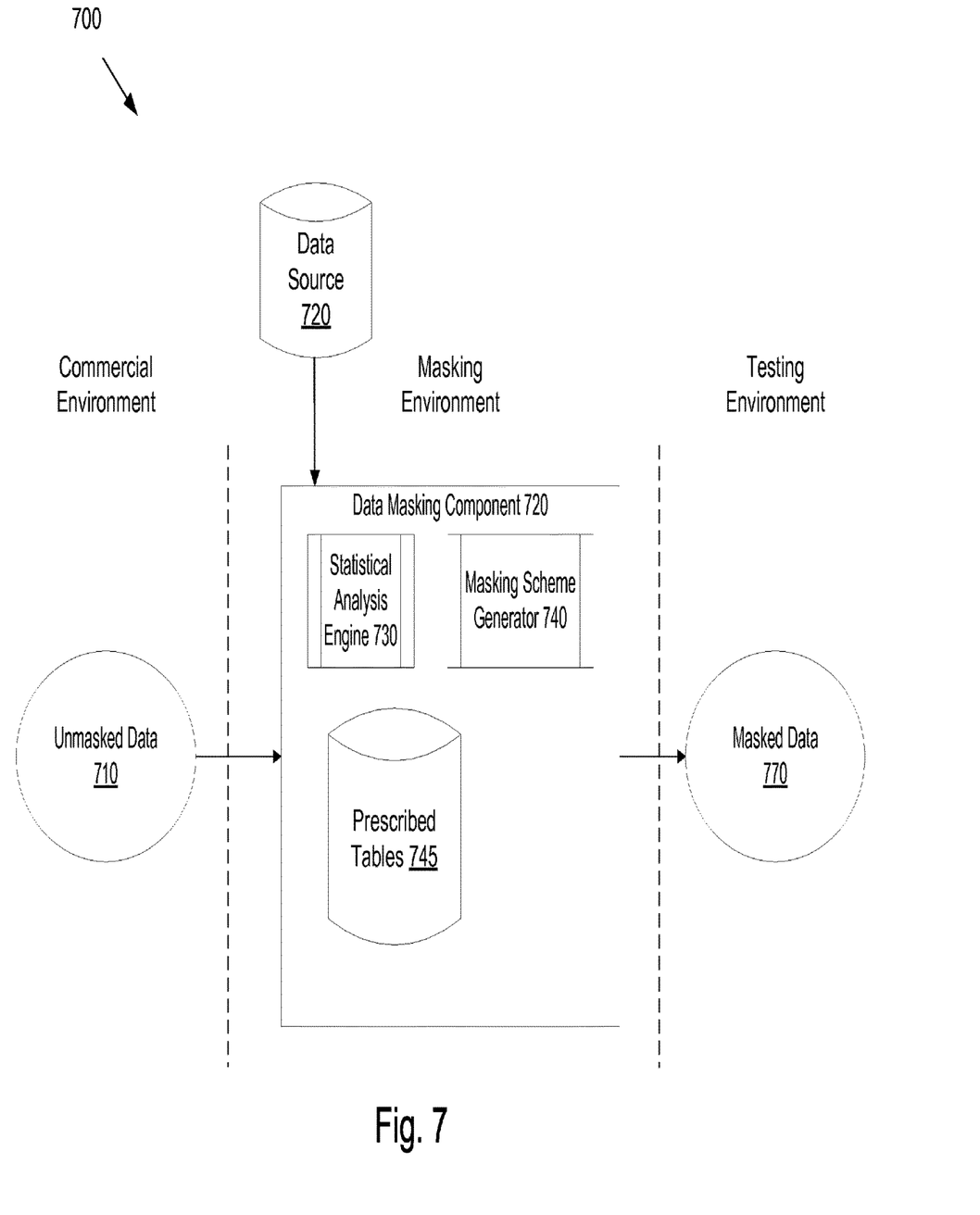
FIG. 7 is a block diagram of an exemplary data masking workflow.

FIG. 7 is a block diagram of an exemplary data masking system 700. The system 700 and variants of it can be used to perform any of the methods described herein. In the example, the data masking tool 720 is configured to receive unmasked data 710 (e.g., source data) and output masked data 770 (e.g., output data). The data masking tool 720 can include a statistical analysis engine 730 that may analyze the unmasked data to determine the statistical distribution within the unmasked data 710. In some embodiments, the statistical analysis engine 730 may receive additional data regarding the unmasked data 710 from data source 720. In some embodiments, the external data source 720 may be used to add additional columnar/row data while maintaining the original statistical distribution. In other embodiments, the additional columnar/row data may be saved by the data masking component 720 to be accessed at a later time by the testing environment computer to remove the additional columnar/row data.

For example, the additional columnar data that is added from external data source 720 may be located on rows 23, 45 and 55. On many occasions, the data may be stolen in transit after the masking environment has completed the data masking and inserting additional values may aid in further obfuscating the data. In various embodiments, the entity receiving the masked data 770 could request a listing of the rows 23, 45 and 55 after receiving the masked data 770.

Upon receiving the additional columnar or row identifiers the entity receiving the marked data 770 may delete the data from the additional columnar or rows.

The data masking tool 720 can also store a plurality of prescribed tables 745 that specify configuration settings for various data masking scenarios, including one or more masking rules 755 per scenario. Based on the prescribed tables 745 and data source 720 the masking scheme generator 740 may generate a data masking scheme and process the unmasked data 710. The unmasked data 710 may be transformed to masked data 770 by the masking scheme generator 740. In practice, the system 700 can be more complicated, with additional functionality, features, and the like.

Figure 8:
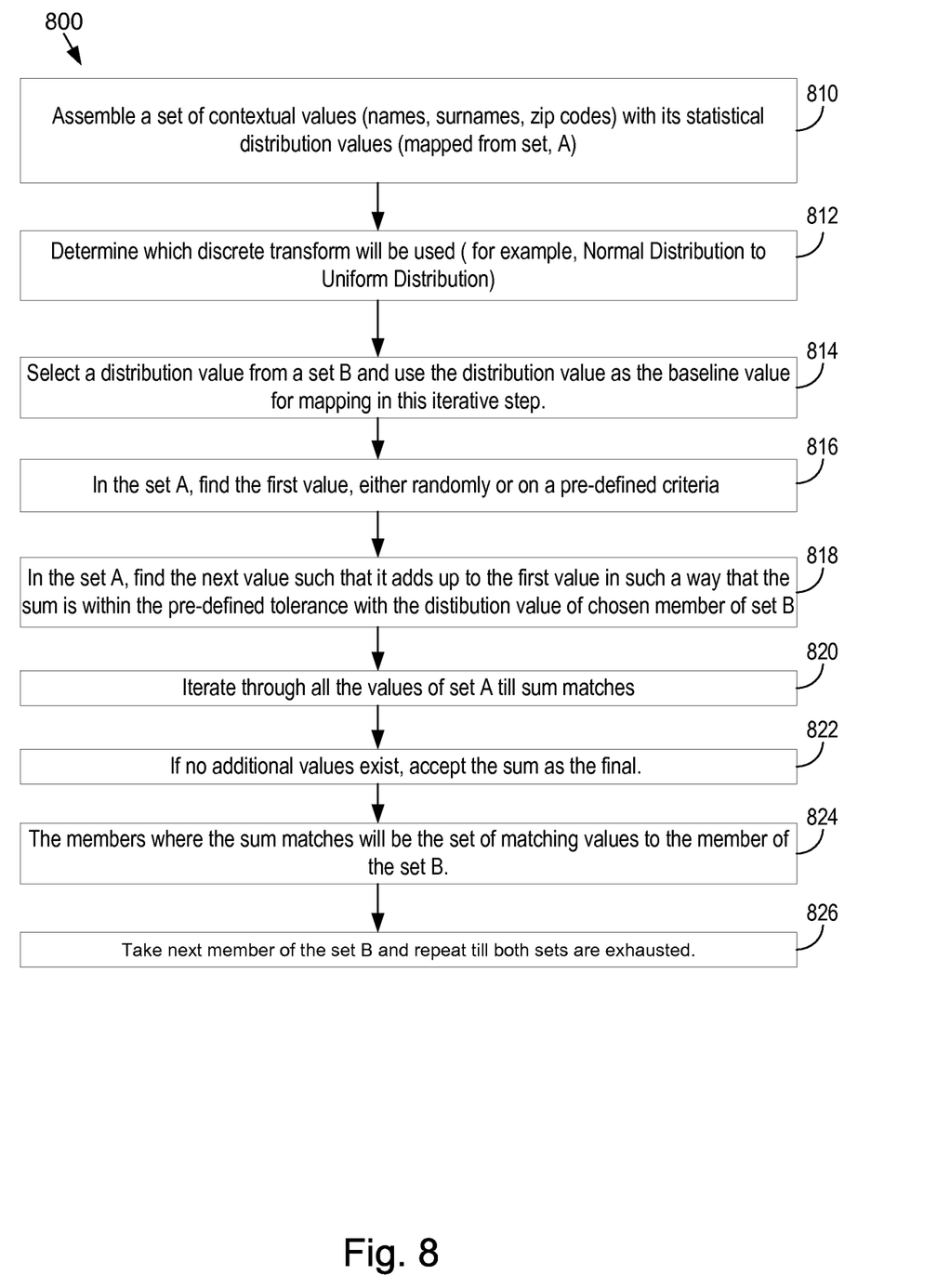
FIG. 8 is a block diagram that depicts an exemplary process flow 800 that may be implemented by the systems described herein.

FIG. 8 is a block diagram that depicts an exemplary process flow 800 that may be implemented by the systems described herein. At step 810, the data masking component 720 may assemble a set of contextual values (names, surnames, or zip codes) with its statistical distribution values (mapped from set, A). At step 820, data masking component 720 determines which discrete transform will be used (e.g., normal distribution or uniform distribution). At step 814, the data masking component 720 may select a distribution value from a set B and use the distribution value as the baseline value for mapping in this iterative step. In step 816, in the set A, find the first value, either randomly or by using a pre-defined criterion. In step 818, the data masking component 720 may find the next value in set A such that it adds up (or equal up) to the first value in such a way that the sum is within the pre-defined tolerance with the distribution value of chosen member of set B. In step 820, the data masking component 720 may Iterate through all the values of set A till sum matches. In step 822, the data masking component 720 may determine if any additional values exist, if no additional values exist the component may accept the sum as the final. In step 824, the data masking component 720 may the members with the sum matching will be the set of matching values to the member of the set B. In step 826, the data masking component 720 may use the next member of the set B and repeat till both sets are exhausted.

The various processes described herein automate the process for different sets of data and on any given mapped to statistical distribution to the uniform distribution which makes unmasking the data most challenging. Other methods may be used to create uniform distribution serve similar function, but they may not do it mathematically. The mechanism of the load might include currently known mechanisms via drivers, from files, and via in-memory upload such as via services, or any other similar load mechanism. The data can be pre-loaded and come with the software (such as in components). The processes described herein covers best measure of statistics, unique data and non-unique data. The system is configured to redistribute the data Redefine statistical values from the system. The system is configured to distribute statistics automatically.

Figure 9:
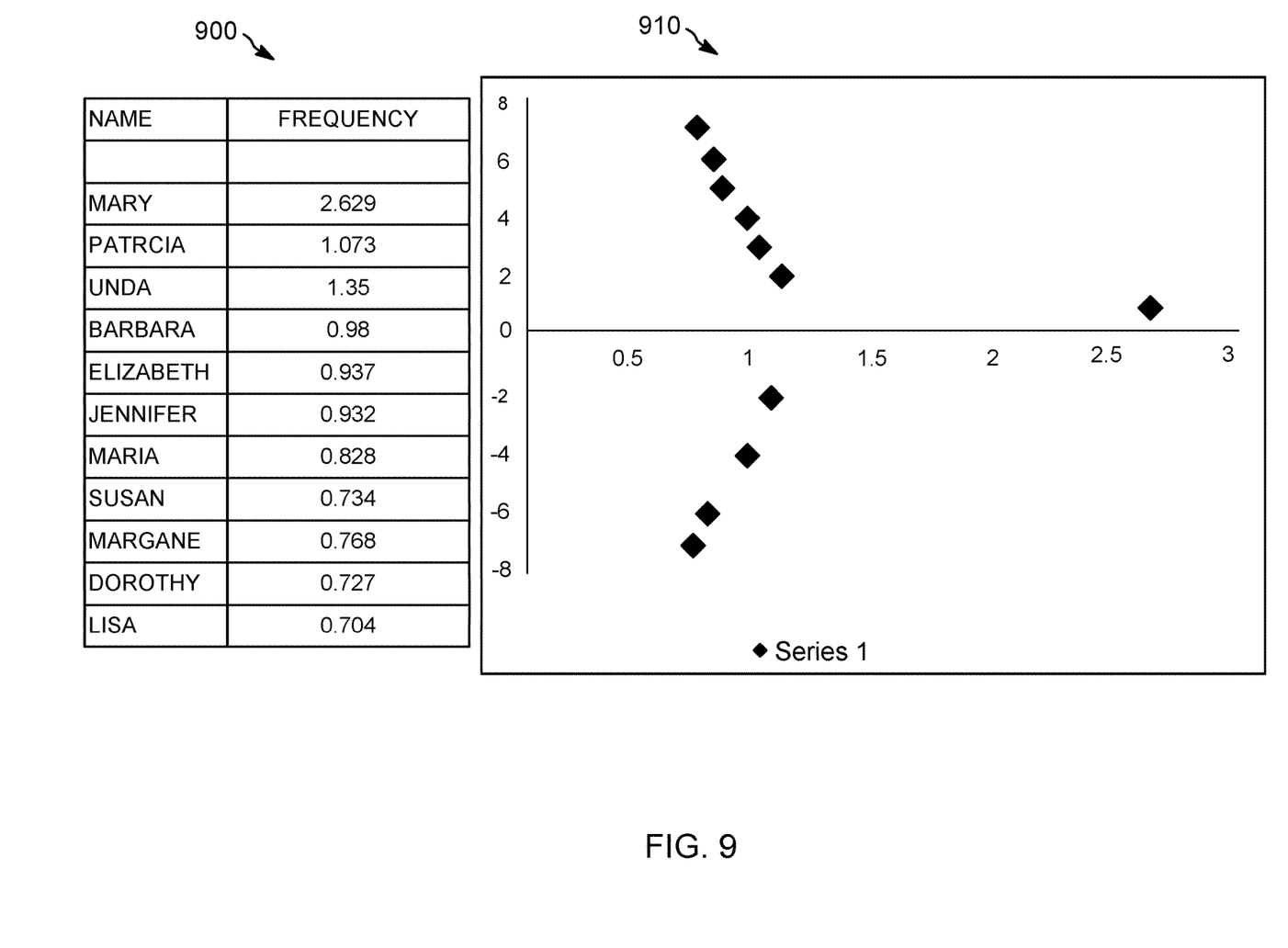
FIG. 9 is an image of example unmasked names and the frequency of names.
Figure 10:
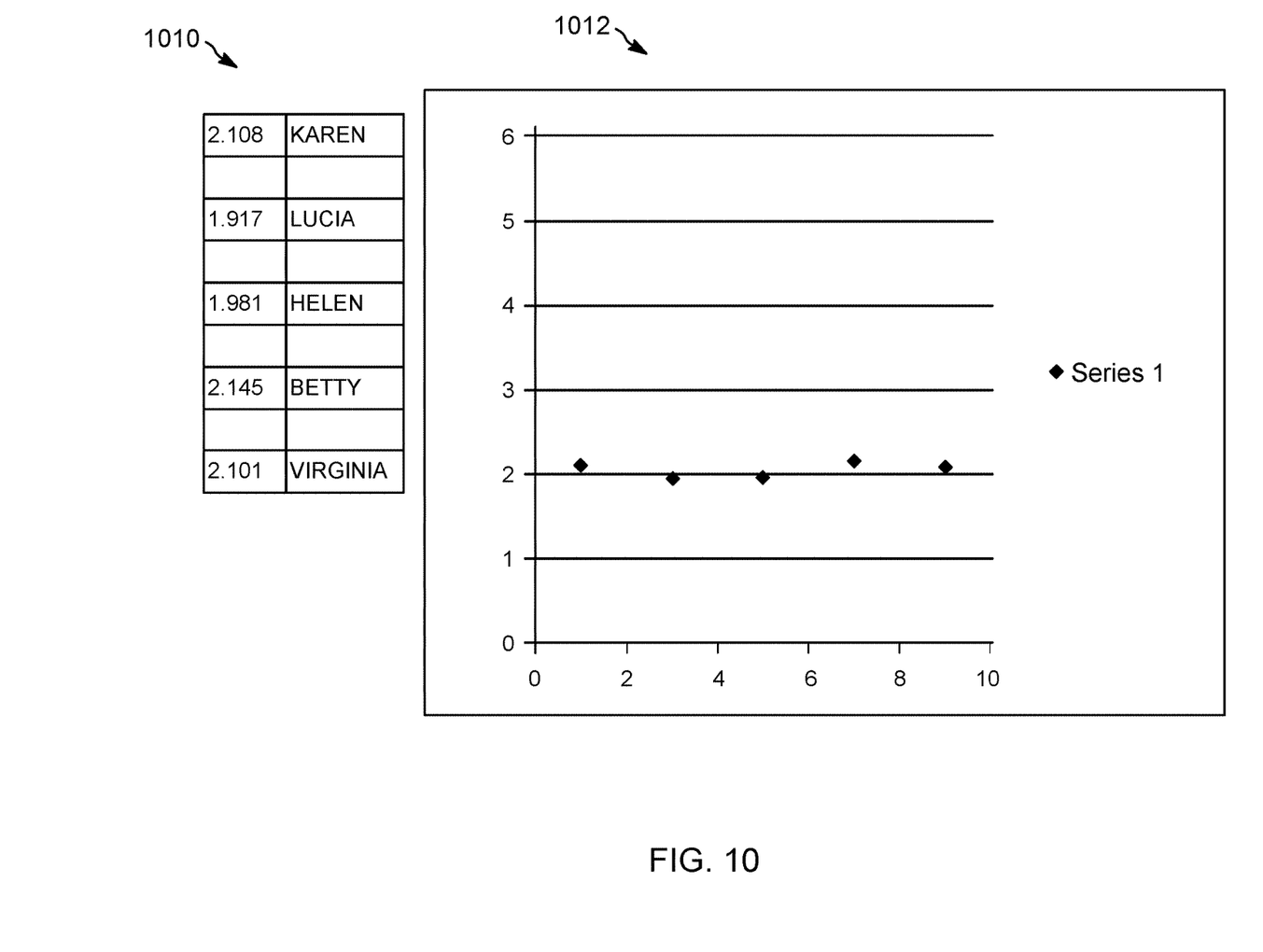
FIG. 10 shows the masked data from FIG. 9 having uniform frequency distribution.
Figure 11:
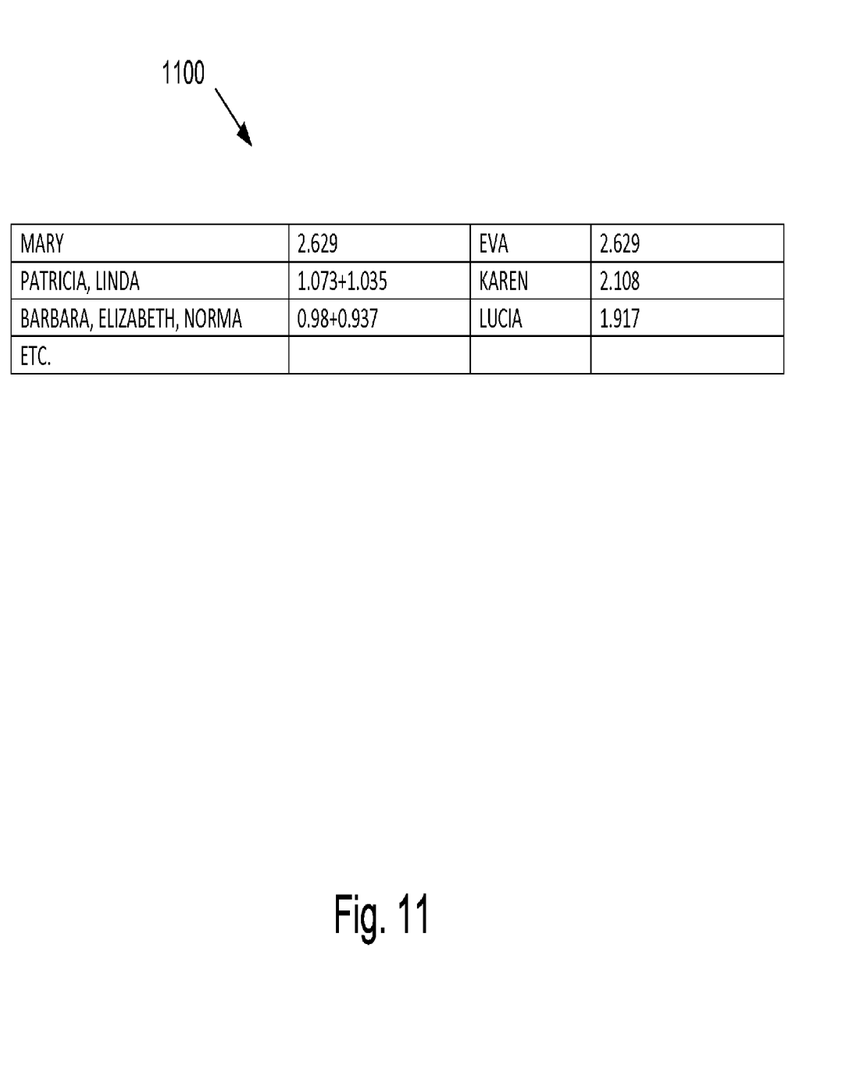
FIG. 11 shows the table that illustrates which unmasked names and frequencies were combined to achieve the statistical distribution from FIG. 10.

FIGS. 9-11 illustrate an example where the names are provided in an unmasked data and how the process described in FIG. 8 would mask the data. FIG. 9 illustrates screen 900 and graph 910 of names and the frequency of names. The system may calculate the frequency or other statistical variable based on the received unmasked data that has 11 names that occurred at various frequencies. FIG. 10 shows the 11 names asked into 5 names that have a uniform frequency distribution. Accordingly, because of the statistical distortion introduced in the masked data it is challenging for someone to unmask the masked data. FIG. 10 shows frequencies of the 5 names and a graph 1012 illustrating the uniform distribution. The data masking component 720 may consolidate some of the unmasked names and mask more than one of the names with a single mask to create a uniform distribution or another type of distribution that is challenging to unmask. Based on the statistical parameter that is used (e.g., frequency, etc.) the system selected the unmasked that is to be combined.

FIG. 11 shows the table 1100 that illustrate which unmasked names and frequencies were combined to achieve the statistical distribution from FIG. 10.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The embodiments are described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general-purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general-purpose computing computer in the form of computers, including a processing unit, a system memory, and a system bus that couples various system components including the system memory to the processing unit. The system memory may include read only memory (ROM) and random-access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

The invention claimed is:

1. A computer-readable storage device containing an executable computer code for masking sensitive information by a computing system that includes one or more servers, a memory for storing information and instructions to be executed by a processor automatically, and coupled via a web network, the computer code comprising instructions for:
   identifying, by a data masking component, a record identifier in a dataset by using a combination of fields;
   utilizing, by the data masking component, the record identifier as a reference to mask one or more original values with substitute values;
   wherein the computer code comprises instructions for aggregating a set of less statistically significant values to a single value by a many-to-one mapping scheme;
   generating, by the data masking component, a masked dataset that masks the sensitive information with the substitute values in place of the one or more original values; and
   outputting, by the mapping computer system to a masked data computer system, the masked dataset to an output device that is viewable by a user responsive to a request by the user, via an input device coupled to the computing system, for the one or more original values.

2. The computer-readable storage device of claim 1, wherein a non-changeable auxiliary data related to a record is used as the record identifier for data masking.

3. The computer-readable storage device of claim 2, wherein an aggregation of the set of less statistically significant values make a combined count of values close to a most statistically significant value in the dataset.

4. The computer-readable storage device of claim 3, wherein the many-to-one mapping scheme is based on the record identifier.

5. The computer-readable storage device of claim 2, wherein the computer code comprises instructions for mapping a single reversible value to a single value by a one-to-one mapping scheme.

6. The computer-readable storage device of claim 5, wherein the one-to-one mapping scheme is based on the record identifier.

7. The computer-readable storage device of claim 2, wherein the computer code comprises instructions for expanding a single value to a set of values by a one-to-many mapping scheme.

8. The computer-readable storage device of claim 7, wherein the one-to-many mapping scheme is based on the record identifier.

9. The computer-readable storage device of claim 1, wherein the computer code is stored in a non-volatile storage for a later execution.

10. The computer-readable storage device of claim 1 wherein the sensitive information comprises personally identifiable information (PII).

11. A computer-readable storage device containing an executable computer code for data mapping, that masks sensitive information, by a computing system that includes one or more servers, a memory for storing information and instructions to be executed by a processor automatically, and coupled via a web network, the computer code comprising instructions for:
   accessing, by a data masking component, a first statistics of an original data set;
   accessing, by the data masking component, a second statistics of a mapping data set;
   uploading, by the data masking component, the original data set and the mapping data set;
   calculating and analyzing, by the data masking component, a plurality of quantities based on the original data set and the mapping data set;
   generating, by the data masking component, a set of permutation of the quantities;
   allowing, by the the data masking component, to select from the set of permutations of the quantities, such that the data mapping of the original data set to a mapped data set, which masks the sensitive information, is performed according to a statistical distribution transform; and
   outputting, by the the data masking component, the mapped data set to an output device that displays the mapped data set to a computer user responsive to a request by the computer user, via an input device coupled to the computing system, for the original data set.

12. The computer-readable storage device as described in claim 11, further wherein the original data set is supplemented with additional data to create an expanded data set.

13. The computer-readable storage device as described in claim 11, wherein the mapped data set has a publicly available data.

14. The computer-readable storage device as described in claim 11, wherein the mapped data set has a privately available data.

15. The computer-readable storage device as described in claim 11, wherein the statistical distribution is chosen from a group consisting of normal distribution, Cauchy distribution, Hypergeometric distribution or Poisson distribution.

16. The computer-readable storage device as described in claim 11, wherein the statistical distribution transform may be performed by aggregating less statistically significant values together to make a combined count of values close to a most statistically significant value in a data set.

17. A computer-readable storage device containing an executable computer code for a data masking cycle, that masks sensitive information, by a computing system that includes one or more servers, a memory for storing information and instructions to be executed by a processor automatically, and coupled via a web network, the computer code comprising instructions for:
   determining, by a data masking component, a unique identifier that uniquely identifies a record in a data set;
   determining, by the data masking component, a degree of distortion for a statistics of the data set to which statistics should be distorted to make masking impossible to guess by using a statistical data distribution;

identifying, by the data masking component, a first id-based masking option;

checking, by the data masking component, if the degree of distortion is satisfied in the data set, if not, then in recursive manner proceeding to find the next available id-based masking option, if the degree of distortion is satisfied, saving the id-based masking option and then masking one or more values of the data set with a set of values derived from the first id-based masking option to generate a masked data set that masks the sensitive information, while continually checking if the degree of distortion is satisfied with each cycle; and outputting, by the data masking component, the masked data set to an output device that displays the masked data set to a computer user responsive to a request by the computer user, via an input device coupled to the computing system, for the data set.

18. A computer-readable storage device as described in claim 17, wherein the data masking cycle is irreversible.

19. A computer-readable storage device as described in claim 17, wherein the data masking cycle is reversible.

* * * * *